US010692392B2

(12) United States Patent
Tashiro et al.

(10) Patent No.: US 10,692,392 B2
(45) Date of Patent: Jun. 23, 2020

(54) DISPLAY APPARATUS AND METHOD FOR DISPLAYING GUIDANCE VIDEO

(71) Applicant: Kyocera Document Solutions Inc., Osaka (JP)

(72) Inventors: Michiko Tashiro, Osaka (JP); Shinichi Nakanishi, Osaka (JP); Emi Tennichi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 282 days.

(21) Appl. No.: 15/801,426

(22) Filed: Nov. 2, 2017

(65) Prior Publication Data

US 2018/0122253 A1    May 3, 2018

(30) Foreign Application Priority Data

Nov. 2, 2016  (JP) ................................ 2016-215516

(51) Int. Cl.
*G09B 19/24*       (2006.01)
*G09B 5/06*        (2006.01)
*H04N 1/00*        (2006.01)

(52) U.S. Cl.
CPC .............. *G09B 5/065* (2013.01); *G09B 19/24* (2013.01); *H04N 1/00411* (2013.01); *H04N 2201/3267* (2013.01); *H04N 2201/3274* (2013.01)

(58) Field of Classification Search
USPC ....... 434/29, 30, 62, 65, 219, 224, 247, 252, 434/365, 379
See application file for complete search history.

(56) References Cited

U.S. PATENT DOCUMENTS

| 5,486,001 | A | * | 1/1996 | Baker ................ A63B 24/0003 434/252 |
| 5,800,179 | A | * | 9/1998 | Bailey .................... A61B 34/76 434/262 |
| 6,200,139 | B1 | * | 3/2001 | Clapper ................. G09B 9/042 434/62 |

(Continued)

FOREIGN PATENT DOCUMENTS

| JP | H11-231729 A | 8/1999 |
| JP | 2004_139523 A | 5/2004 |

(Continued)

*Primary Examiner* — Kurt Fernstrom
(74) *Attorney, Agent, or Firm* — James Judge

(57) ABSTRACT

A display apparatus includes a display, a display controller, a sensor, and a work identifying unit. The display controller causes the display to continuously display a guidance video. The guidance video indicates a specified work procedure of respective processes. The display controller analyzes a work procedure that has been actually performed by the operator from a time series of the respective works identified by the work identifying unit, compares the analyzed work procedure with the process sequence and the specified work procedure, and returns to the process including an unprocessed work that has not been performed in accordance with the process sequence and the specified work procedure to cause the display to redisplay the guidance video indicating the work procedure of the returned process when having determined that the work performed by the operator is not performed in accordance with the process sequence and the specified work procedure.

8 Claims, 4 Drawing Sheets

(56) References Cited

U.S. PATENT DOCUMENTS

| | | | | |
|---|---|---|---|---|
| 6,537,076 B2* | 3/2003 | McNitt | A63B 24/0003 | 434/247 |
| 7,376,245 B2* | 5/2008 | Morozumi | A63B 24/0003 | 382/103 |
| 7,502,491 B2* | 3/2009 | Shirai | A63B 24/0003 | 382/107 |
| 8,770,980 B2* | 7/2014 | Best | G09B 9/05 | 434/65 |
| 8,896,626 B2* | 11/2014 | Kawai | G11B 27/034 | 345/629 |
| 10,170,153 B2* | 1/2019 | Ekambaram | G11B 27/005 | |
| 2005/0255431 A1* | 11/2005 | Baker | G09B 5/067 | 434/169 |
| 2010/0015585 A1* | 1/2010 | Baker | A63B 24/0003 | 434/247 |
| 2013/0036353 A1* | 2/2013 | Zavesky | H04L 65/1093 | 715/716 |
| 2014/0065588 A1* | 3/2014 | Jacobson | G09B 23/283 | 434/263 |
| 2014/0074180 A1* | 3/2014 | Heldman | A61B 5/1101 | 607/45 |
| 2015/0050623 A1* | 2/2015 | Falash | G09B 9/24 | 434/38 |

FOREIGN PATENT DOCUMENTS

| | | |
|---|---|---|
| JP | 2007_223235 A | 9/2007 |
| JP | 2007_240697 A | 9/2007 |
| JP | 2008_162061 A | 7/2008 |
| JP | 2010_278986 A | 12/2010 |
| JP | 2014_108532 A | 6/2014 |

\* cited by examiner

DISPLAY APPARATUS AND METHOD FOR DISPLAYING GUIDANCE VIDEO

INCORPORATION BY REFERENCE

This application is based upon, and claims the benefit of priority from, corresponding Japanese Patent Application No. 2016-215516 filed in the Japan Patent Office on Nov. 2, 2016, the entire contents of which are incorporated herein by reference.

BACKGROUND

Unless otherwise indicated herein, the description in this section is not prior art to the claims in this application and is not admitted to be prior art by inclusion in this section.

There is provided a typical image forming apparatus, such as a printer and a multi-functional peripheral, that has a function to display an operation guide (guidance video) for eliminating a trouble on a display when an apparatus trouble has occurred. Such an image forming apparatus enables even an operator, who is unfamiliar to an apparatus operation, to perform a maintenance work by looking at a guidance video to eliminate a trouble.

For example, there is proposed a technique that can display a guidance video in an appropriate configuration for both of an operator who is versed in handling of an apparatus and an operator who is unfamiliar to an apparatus operation, as follows. An image forming apparatus displays both of a "next procedure" button and a "continuous display" button when displaying a guidance video on its display. Performing a touch operation to the "continuous display" button continuously displays the guidance video for enabling understanding of an overall operation flow, and performing a touch operation to the "next procedure" button displays the guidance video by a unit of one screen for enabling understanding of the operations one by one.

SUMMARY

A display apparatus according to one aspect of the disclosure includes a display, a display controller, a sensor, and a work identifying unit. The display controller causes the display to continuously display a guidance video in a process sequence when a maintenance work of one's own device is performed. The guidance video indicates a specified work procedure of respective processes in the maintenance work. The sensor detects operation states of respective members of the one's own device. The work identifying unit identifies a work performed by an operator based on a detection result of the sensor. The display controller analyzes a work procedure that has been actually performed by the operator from a time series of the respective works identified by the work identifying unit, compares the analyzed work procedure with the process sequence and the specified work procedure, and returns to the process including an unprocessed work that has not been performed in accordance with the process sequence and the specified work procedure to cause the display to redisplay the guidance video indicating the work procedure of the returned process when having determined that the work performed by the operator is not performed in accordance with the process sequence and the specified work procedure.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Figure 1:
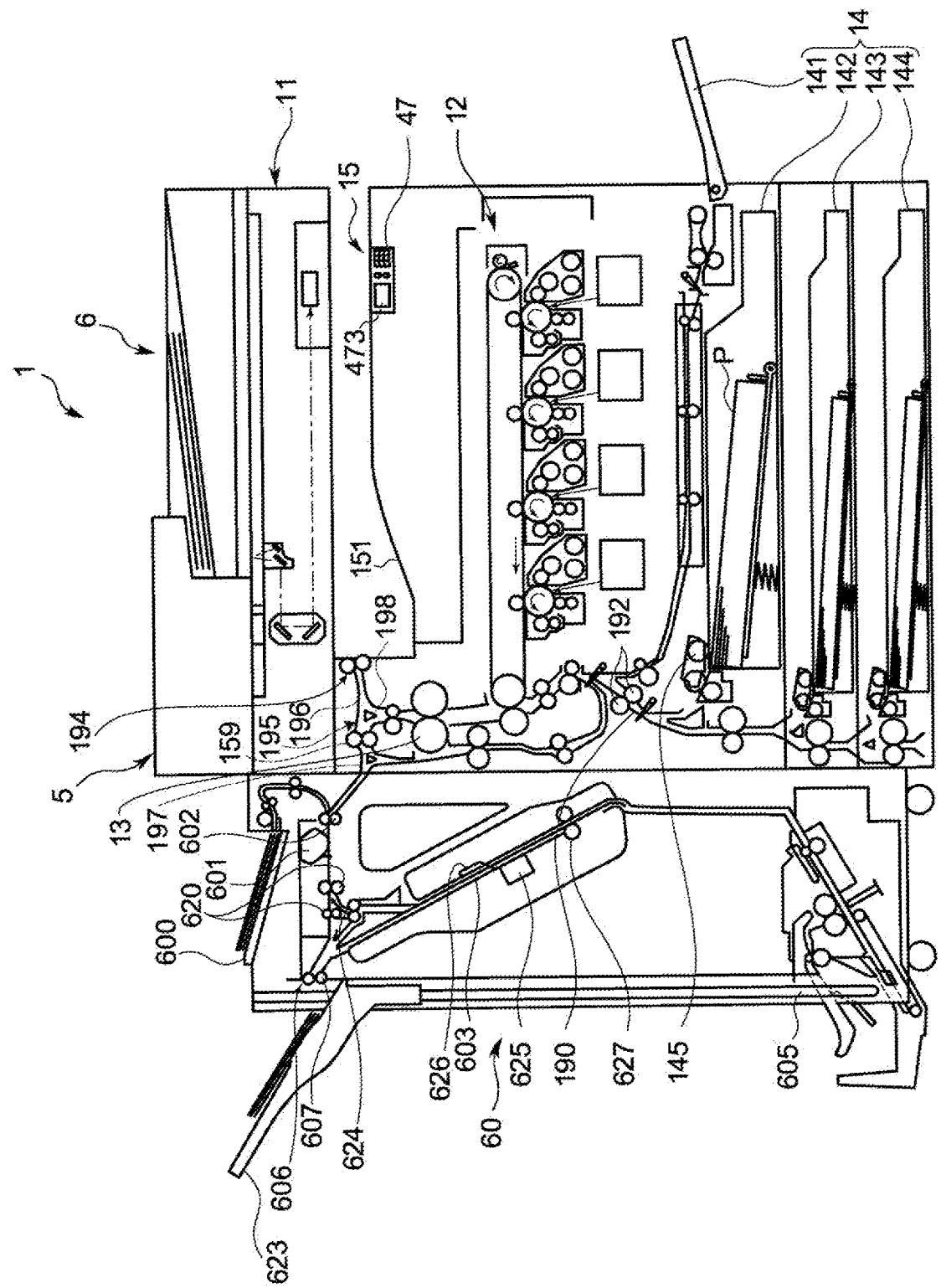
FIG. 1 illustrates a structure illustrating an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a display apparatus, display method and an image forming apparatus according to one embodiment of the disclosure with reference to the drawings. FIG. 1 illustrates a structure of the image forming apparatus according to the one embodiment of the disclosure. An image forming apparatus 1 as one example of the display apparatus according to the one embodiment of the disclosure is a multi-functional peripheral that has a plurality of functions, such as a copy function, a printer function, a scanner function, and a facsimile function. The image forming apparatus 1 is constituted including an image forming unit 12, a fixing unit 13, a paper sheet feeder 14, a recording-sheet discharge unit 15, a document conveying unit 6, a document reading unit 5, and similar unit in an apparatus main body 11. Further, the image forming apparatus 1 includes a postprocessing unit (finisher) 60.

The image forming unit 12 performs an image forming operation that forms a toner image on a recording sheet P fed from the paper sheet feeder 14. The image-formed recording sheet P is discharged toward a discharge tray 151 by a discharge roller 194.

A conveyance path 190 branches into a first conveyance path 196 heading for the recording-sheet discharge unit 15 and a second conveyance path 197 heading for the postprocessing unit 60. A branch point 195 includes a switching unit 198 that distributes and guides the recording sheet P, which is conveyed toward the branch point 195, to any one of the first conveyance path 196 or the second conveyance path 197. The switching unit 198 has a distal end portion pointed toward a conveyance-direction upstream side of the recording sheet P. Closing one of conveyance path portions that head for the first conveyance path 196 or the second conveyance path 197 from the conveyance path 190 before the branch by turning of the distal end portion conveys the recording sheet P toward the first conveyance path 196 or the second conveyance path 197 that connects to the unclosed conveyance path portion.

The image forming apparatus 1 further includes the postprocessing unit 60. The postprocessing unit 60 includes a platen 600, a punching unit 601, a conveyance roller pair 602, a recording-sheet cradle 603, a conveyance roller pair 620, a discharge roller pair 607, a discharge tray 623, and a conveyance-branch guide 624.

Further, the postprocessing unit 60 includes a stapling device 625, a receiving member 626, and a conveyance roller pair 627.

The platen 600 is a tray on which a document, where postprocessing is to be performed by the postprocessing unit 60, is placed.

The punching unit 601 performs punch processing as one of the postprocessings to a plurality of recording sheets P (including both of a recording sheet P after image formation and a document on the platen 600) conveyed from a discharge roller pair 159 of the apparatus main body 11 or from the platen 600.

The recording-sheet cradle 603 temporarily stocks the recording sheet P or the document conveyed from the conveyance roller pairs 602 and 620, as a recording-sheet bundle.

The discharge roller pair 607 is located in a recording-sheet discharge unit 606 to which the recording sheet P is discharged from the postprocessing unit 60, and discharges the recording sheet P conveyed from the conveyance roller pairs 602 and 620 and the recording-sheet bundle conveyed from the recording-sheet cradle 603, to the discharge tray 623.

The stapling device 625 performs staple processing as the postprocessing to the recording sheet P conveyed to the recording-sheet cradle 603.

The receiving member 626 receives and holds a lower end of the recording sheet P conveyed to the recording-sheet cradle 603. The conveyance roller pair 627 conveys the recording sheet P or the recording-sheet bundle in a downward direction from the recording-sheet cradle 603.

The recording-sheet cradle 603 includes a driving unit (not illustrated) that moves the receiving member 626 in a conveying-out direction of the recording-sheet bundle. Then, driving the driving unit in accordance with a control signal from a driving controller 611 (see FIG. 2) conveys the recording-sheet bundle, which has been held at the receiving member 626, up to the discharge roller pair 607, and then discharges the recording-sheet bundle from the recording-sheet discharge unit 606 to the discharge tray 623 by the discharge roller pair 607.

The stapling device 625 is configured to be movable by a driving unit (not illustrated) that is driven by the control signal from the driving controller 611. When performing ordinary staple processing on the recording sheet P, which has been conveyed to the recording-sheet cradle 603, the stapling device 625 is moved to a position close to an end of the recording sheet P and then performs the staple processing to a periphery of the end of the recording sheet P. When performing book binding, the stapling device 625 is moved close to a center of the recording sheet P and then performs the staple processing close to the center of the recording sheet P to perform saddle stitching.

The image forming apparatus 1 enables a setting of the postprocessing on the recording sheet P, a setting of performing book binding processing on the recording sheet P after image transfer, and similar setting by inputting of an operation instruction from an operation unit 47 of the image forming apparatus 1 by an operator.

The apparatus main body 11 and the postprocessing unit 60 include openable and closable covers, levers, and similar member (not illustrated) in various places. For example, a front cover is located on the front surface of the apparatus main body 11, and a right cover and a left cover are located on the right-side surface and the left side surface of the apparatus main body 11, respectively. Securing levers (not illustrated) for securing a replenishment toner bottle and a waste toner bottle, which are not illustrated, are located inside the apparatus main body 11. A front cover is located on the front surface of the postprocessing unit 60.

An operator operates the covers and the levers of the apparatus main body 11 and the postprocessing unit 60 when performing a maintenance work of the image forming apparatus 1. For example, when a recording-sheet jam has occurred, an operator separates the postprocessing unit 60 from the apparatus main body 11 and then sets the inside of the apparatus main body 11 in a viewable state by opening the right cover or the left cover of the apparatus main body 11 to remove a slip of paper that has got stuck in the conveyance path 190, the image forming unit 12, the fixing unit 13, or similar unit. When replacing the toner bottle, an operator opens the front cover and further releases the securing lever to take out the empty toner bottle. When a recording-sheet jam has occurred inside the postprocessing unit 60, an operator sets the inside of the postprocessing unit 60 in a viewable state by opening the front cover of the postprocessing unit 60 to remove a slip of paper that has got stuck in the punching unit 601, the recording-sheet cradle 603, the conveyance-branch guide 624, or similar unit.

Respective members such as the covers, the levers, and similar member of the apparatus main body 11 and the postprocessing unit 60 include sensors (see FIG. 2) that detect operation states. For example, the sensor located at the cover detects an open/close state of the cover. Sensors are also located at sheet feed cassettes 142, 143, and 144 in the paper sheet feeder 14 and the sensors detect extraction/pushed-in states of these sheet feed cassettes.

Figure 2:
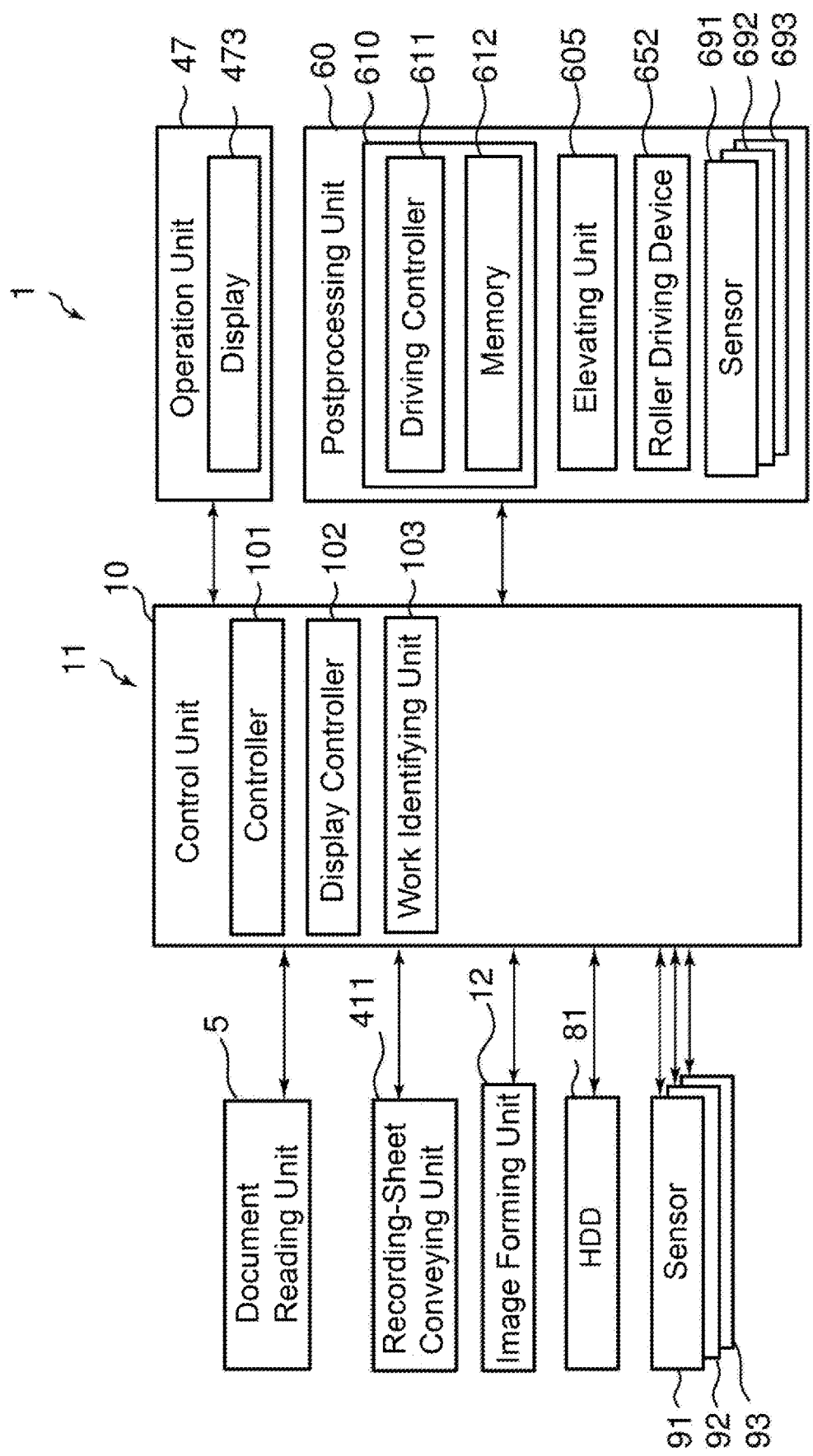
FIG. 2 illustrates a function block diagram illustrating an internal configuration of the image forming apparatus according to the one embodiment.

Next, a description will be given of an electrical configuration of the image forming apparatus 1 that includes the postprocessing unit 60. FIG. 2 illustrates a function block diagram illustrating an internal configuration of the image forming apparatus 1.

The document reading unit 5 irradiates a document with an image-irradiation lamp (not illustrated) and then reads an image from the document by receiving a reflection light with a CCD sensor (not illustrated).

A recording-sheet conveying unit 411 is constituted of a feed roller 145, a conveyance roller pair 192, and similar roller, which are illustrated in FIG. 1, and conveys the recording sheet P, which is housed in a manual bypass tray 141 and the sheet feed cassettes 142, 143, and 144, to the image forming unit 12, and up to the discharge roller pair 607 and the recording-sheet discharge unit 606 that communicate with the postprocessing unit 60. The discharge roller pair 607 and the recording-sheet discharge unit 606 also constitute the recording-sheet conveying unit 411.

As also illustrated in FIG. 1 in addition to FIG. 2, the operation unit 47 accepts an instruction from an operator on various kinds of operations and processes that the image forming apparatus 1 can execute. The operation unit 47 includes a (touch-screen) display 473 with a touch panel function. The display 473 corresponds to the display described in the claims.

Sensors 91 to 93, as described above, are located at the respective members such as the covers and the levers (not illustrated) in the apparatus main body 11 and detect the operation states of the respective members. The sensors 91 to 93 may be any of a mechanical sensor, an optical sensor, and a magnetic sensor.

A control unit 10 is constituted of a processor, a RAM, a ROM, a dedicated hardware circuit, and similar circuit. The processor is, for example, a CPU, an MPU, an ASIC. The control unit 10 includes a controller 101, a display controller 102, and a work identifying unit 103. The control unit 10 functions as the controller 101, the display controller 102, and the work identifying unit 103 by operating, for example, in accordance with control programs stored in an HDD 81.

The controller 101 is connected to the document reading unit 5, the recording-sheet conveying unit 411, the image forming unit 12, the operation unit 47, the sensors 91 to 93, and similar unit. The controller 101 controls the above-described respective mechanisms, which are connected to the controller 101, and transmits and receives signals or data to/from the respective mechanisms.

The controller 101 controls driving and processes of respective mechanism units that are necessary to execute controls for the respective functions of the scanner function, the copy function, and the printer function, in accordance with an execution instruction on a job accepted via the operation unit 47 or similar unit from an operator. In particular, the controller 101 controls displaying on the display 473. The touch panel function of the display 473 accepts a touch operation of an operator relative to the display 473.

The controller 101 is connected to the postprocessing unit 60. The postprocessing unit 60 includes a controller 610, an elevating unit 605, a roller driving device 652, and sensors 691 to 693. The sensors 691 to 693, as described above, are located at the respective members such as the covers and the levers, which are not illustrated, in the postprocessing unit 60 and detect the operation states of the respective members. The sensors 691 to 693 may be any of a mechanical sensor, an optical sensor, and a magnetic sensor. While the postprocessing unit 60 includes the above-described respective mechanisms, here respective units related to an elevation control of the discharge tray 623 will be described.

The controller 610 is constituted of a CPU, a RAM, a ROM, a dedicated hardware circuit, and similar circuit. The controller 610 includes the driving controller 611 and a memory 612.

The driving controller 611 manages the whole control of the postprocessing unit 60. The driving controller 611 cooperates with the controller 101 on the apparatus main body 11 side via communication to control the operations of the respective mechanisms of the postprocessing unit 60, or to control an operation mechanism such as the display 473 on the apparatus main body 11 side.

The roller driving device 652 is a power generation device such as a motor that imparts a rotary drive power to the discharge roller pair 607. The roller driving device 652 is drivingly controlled by the controller 101 and the driving controller 611. The roller driving device 652 also imparts the rotary drive power to other rollers, such as the conveyance roller pairs 602 and 620.

A description will be further given of the control unit 10. When the maintenance work of the image forming apparatus 1 is performed, the display controller 102 causes the display 473 to display a guidance video that indicates a work procedure of respective processes in the maintenance work. That is, the display controller 102 has charge of controlling an operation to display the guidance video, among display operations by the display 473.

Data of the guidance video is saved in, for example, a storage region of a non-volatile memory (not illustrated) in the control unit 10 or the HDD 81. The display controller 102 reads the appropriate data of the guidance video from the storage region and causes the display 473 to display. The guidance video is configured of the videos of the respective processes in the maintenance work. The display controller 102 causes the display 473 to continuously display the guidance videos of the respective processes in an order from a first process. The guidance video may be an animation or a moving image, or may be still images that are continuously displayed.

Figure 3:
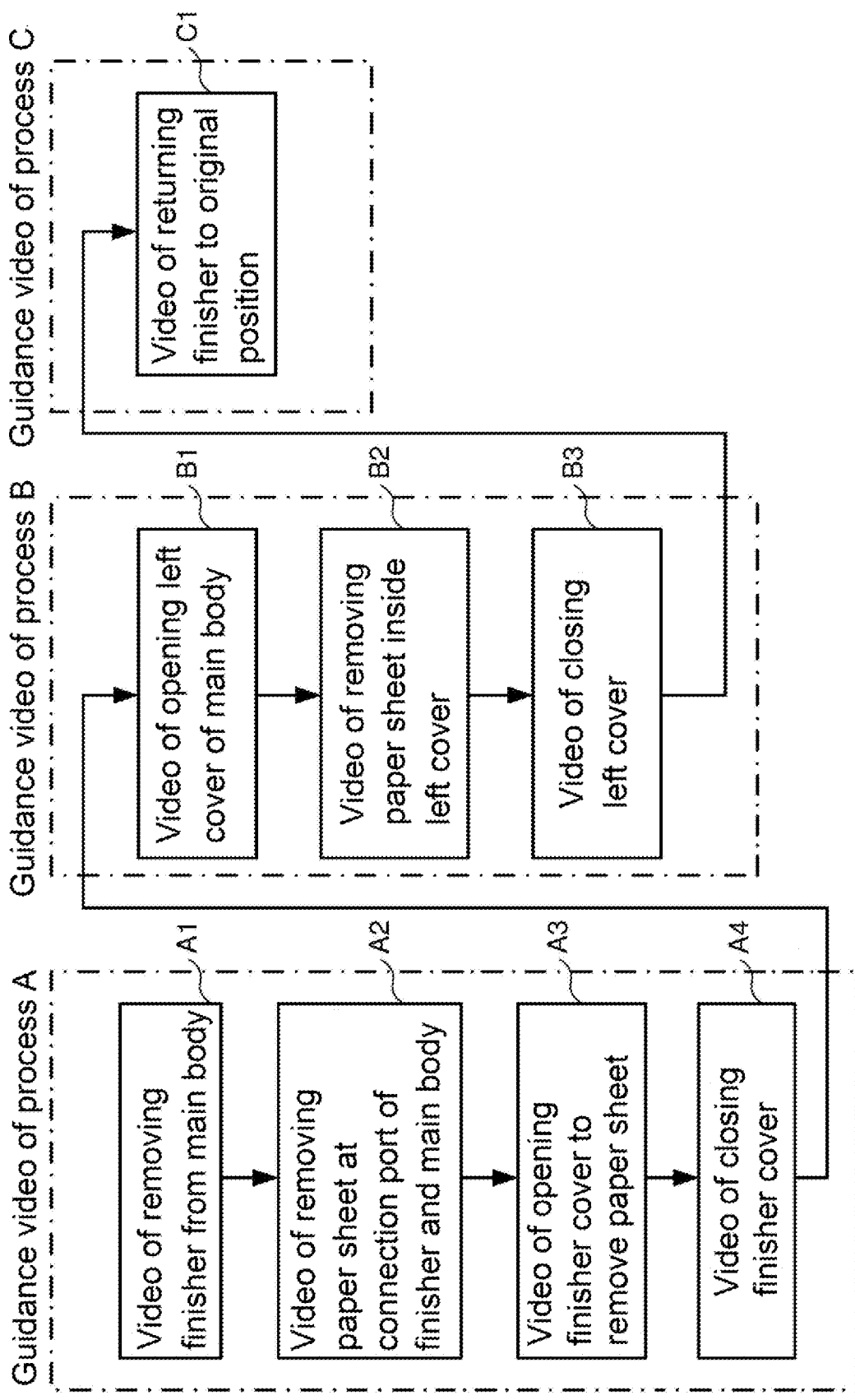
FIG. 3 illustrates an exemplary configuration of a guidance video.

FIG. 3 illustrates an exemplary configuration of the guidance video. The guidance video illustrated as an example in FIG. 3 is a guidance video that indicates the work procedure of the respective processes in an elimination work of the recording-sheet jam. For example, the elimination work of the recording-sheet jam has three processes. A first process A is a treatment process of the finisher (the postprocessing unit 60). The guidance video of the process A is further subdivided into four videos as follows: a video A1 that indicates the work of removing the finisher from a main body (the apparatus main body 11); a video A2 that indicates the work of removing a paper sheet at a connection port of the finisher and the main body; a video A3 that indicates the work of removing the paper sheet by opening a finisher cover (the front cover of the postprocessing unit 60); and a video A4 that indicates the work of closing the finisher cover.

A next process B is a treatment process of the main-body-left-side inside. The guidance video of the process B is further subdivided into three videos as follows: a video B1 that indicates the work of opening the left cover of the main body; a video B2 that indicates the work of removing the paper sheet inside the left cover; and a video B3 that indicates the work of closing the left cover.

A final process C is a treatment process of the finisher again. The guidance video of the process C is configured of only a video C1 that indicates the work of returning the finisher to an original position.

The display controller 102 causes the display 473 to display the guidance video in the order of the video A1, the video A2, . . . , the video C1, which are described above, when the recording-sheet jam occurs. When causing the display 473 to display up to the video C1, the display controller 102 returns to the video A1 and causes the display 473 to redisplay the guidance video from a start.

Returning to FIG. 2, the work identifying unit 103 identifies a location where the work has been performed by an operator based on detection results of the sensors 91 to 93, and 691 to 693. For example, when the sensor 91, which detects a connection state of the apparatus main body 11 and the postprocessing unit 60, detects disconnection of the postprocessing unit 60 and the apparatus main body 11, the work identifying unit 103 identifies that the postprocessing unit 60 has been removed from the apparatus main body 11 by the operator. For example, when the sensor 92, which detects opening and closing of the left cover of the apparatus main body 11, detects the opening of the left cover, the work identifying unit 103 identifies that the left cover has been opened by the operator and the paper sheet inside the left cover has been removed.

The display controller 102 further detects the work procedure of the operator from a time series of the work identified by the work identifying unit 103 to control displaying of the guidance video corresponding to a discrepancy between the work procedure of the operator and the correct work procedure. Specifically, the display controller 102 detects the discrepancy between the work procedure of the operator and the correct work procedure by comparing the time series of the work identified by the work identifying unit 103 and the correct work procedure. The data that indicates the correct work procedure is saved in, for example, the storage region of the non-volatile memory (not illustrated) in the control unit 10 or the HDD 81. The display controller 102 appropriately refers to the data that indicates the correct work procedure saved in the storage region to detect the discrepancy between the work procedure of the operator and the correct work procedure.

For example, the display controller 102 analyzes the work procedure of the operator from the time series of respective works identified by the work identifying unit 103, compares the analyzed work procedure with a sequence (namely, a process sequence) where the respective processes, which configure the maintenance work performed for problem-solving, are executed, and the sequence of the work (namely, a specified work procedure) in all the works included in the respective processes, and then determines that the discrepancy occurs between the work procedure of the operator and the correct work procedure when having determined that the work having been performed by the operator is not performed in accordance with the process sequence and the specified work procedure, the display controller 102.

Thus, the display controller 102 ensures the simple and quick detection of the discrepancy between the work procedure of the operator and the correct work procedure by comparing the time series of the work identified by the work identifying unit 103 and the correct work procedure.

As one example of a display control of the guidance video, when having determined that a necessary work has been skipped, the display controller 102 returns to the process that includes the skipped work and causes the display 473 to redisplay the guidance video.

For example, when analyzing the work procedure of the operator from the time series of the respective works identified by the work identifying unit 103, comparing the analyzed work procedure with the above-described process sequence and the above-described specified work procedure, and having determined that the work performed by the operator is not performed in accordance with the process sequence and the specified work procedure, an unprocessed work is present, and the work where the work procedure is later than the unprocessed work is performed first, the display controller 102 determines that the necessary work has been skipped.

For example, in the elimination work of the recording-sheet jam where the guidance video in FIG. 3 is displayed, when during the displaying of the guidance video of the process B, the opening of the left cover is detected by the sensor 92, which detects the opening and closing of the left cover of the apparatus main body 11, without detection of the disconnection of the postprocessing unit 60 and the apparatus main body 11 by the sensor 91, which detects the connection state of the apparatus main body 11 and the postprocessing unit 60, the display controller 102 determines that the work of opening the finisher cover to remove the paper sheet in the process A has been skipped and aborts the displaying of the guidance video of the process B to redisplay the guidance video from the first video A1 of the process A.

Thus, returning to the process that includes the skipped work and causing the display 473 to redisplay the guidance video by the display controller 102 ensures reminding the operator that the necessary work has been skipped and further what the contents of the skipped work is. This ensures causing the maintenance work to smoothly proceed with the correct work procedure.

As another example of the display control of the guidance video, when having determined that the work has not been skipped and has been performed in accordance with the procedure indicated by the process, and having determined that the work of the process later than the process corresponding to the guidance video being displayed is performed at this point, the display controller 102 skips the guidance video of intermediate processes of up to a present process the work of which the operator performs at this point and causes the display 473 to display the guidance video of the present process.

That is, when having determined that the respective works are performed in accordance with the procedure indicated by the process without the work unprocessed and skipped, based on the time series of the respective works identified by the work identifying unit 103, and having determined that the work of the process later than the process corresponding to the guidance video being displayed on the display 473 at this point is performed at the point, the display controller 102 does not cause the display 473 to display the guidance video of the intermediate processes of up to the process the work of which is performed by the operator at the point and to display the guidance video of the process the work of which is performed.

For example, in the elimination work of the recording-sheet jam where the guidance video in FIG. 3 is displayed, when during display of the guidance video of the process A, the opening of the left cover is detected (note, however, that the disconnection of the postprocessing unit 60 and the apparatus main body 11 has been detected, and after that the connection of the postprocessing unit 60 and the apparatus main body 11 is detected by the sensor 91, which detects the connection state of the apparatus main body 11 and the postprocessing unit 60; that is, the work of the process A has been terminated) by the sensor 92, which detects the opening and closing of the left cover of the apparatus main body 11, the display controller 102 determines that the work of the process later than the process corresponding to the currently displayed guidance video is performed and then causes the display 473 to display the guidance video of the process B by skipping the remaining guidance video of the process A.

Thus, skipping the guidance video of the intermediate processes of up to the present process the work of which the operator currently performs and causing the display 473 to display the guidance video of the present process, the display controller 102 ensures eliminating disturbance of the operator caused by a significant divergence between the work that the operator currently performs and the work (already completed work) indicated in the guidance video when the operator turns his or her eyes back to the guidance video after having performed the work by taking his or her eyes off the guidance video to complete the work in accordance with the process sequence.

As further, another example of the display control of the guidance video, the display controller 102 may cause the display 473 to redisplay the guidance video by returning to the process the work of which is not yet completed by the operation after termination of the displaying of the guidance video of the final process. For example, in the elimination work of the recording-sheet jam where the guidance video in FIG. 3 is displayed, when at a time of termination of the displaying of the video C1, the opening of the left cover is not detected (note, however, that the disconnection of the postprocessing unit 60 and the apparatus main body 11 has been detected and after that the connection of the postprocessing unit 60 and the apparatus main body 11 is detected by the sensor 91, which detects the connection state of the apparatus main body 11 and the postprocessing unit 60. That is, the work of the process A has been terminated) by the sensor 92, which detects the opening and closing of the left cover of the apparatus main body 11, the display controller 102 determines that while the work of the process A has completed, the work of the process B has not yet completed and causes the display 473 to redisplay the guidance video from the video B1 of the process B (that is, the video of the earliest work procedure in the process in which the work of the earliest work procedure belongs among the uncompleted works) not from the video A1 of the process A.

Thus, when the guidance video is repeatedly displayed, returning to the process the work of which has not yet been completed by the operator and causing the display 473 to redisplay the guidance video without causing the display 473 to redisplay the guidance video of the process the work of which has been terminated by the operator eliminate the need for the operator to repeatedly look at the unnecessary guidance video and ensures improvement of convenience for the operator.

Figure 4:
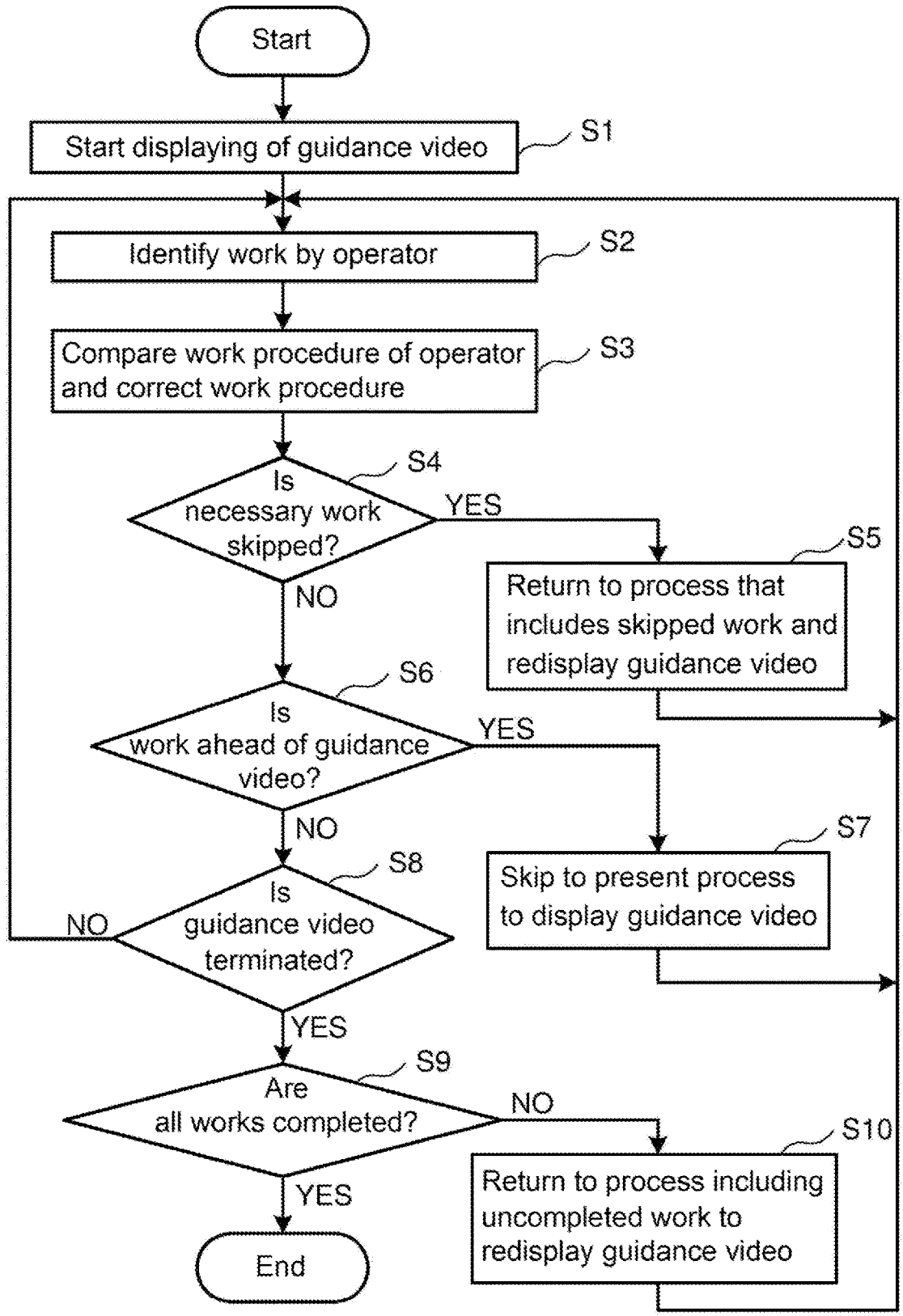
FIG. 4 illustrates display processing of the guidance video in the image forming apparatus according to the one embodiment.

Next, a description will be given of display processing of the guidance video in the image forming apparatus 1. FIG. 4 illustrates the display processing of the guidance video in the image forming apparatus 1.

When the maintenance work is performed in the image forming apparatus 1, the display controller 102 causes the display 473 to display the guidance video that indicates the work of the respective processes in the maintenance work (Step S1).

Subsequently, the work identifying unit 103 identifies the work performed by the operator based on the detection results of the sensors 91 to 93, and 691 to 693 (see FIG. 2) (Step S2). For example, when the sensor 91, which detects the connection state of the apparatus main body 11 and the postprocessing unit 60, has detected the disconnection of the postprocessing unit 60 and the apparatus main body 11, the work identifying unit 103 identifies that the operator has removed the postprocessing unit 60 from the apparatus main body 11. For example, when the sensor 92, which detects the opening and closing of the left cover of the apparatus main body 11, has detected the opening of the left cover, the work identifying unit 103 identifies that the operator has opened the left cover and has removed the paper sheet inside the left cover.

Subsequently, the display controller 102 compares the time series of the work identified by the work identifying unit 103 and the correct work procedure to identify the discrepancy between the work procedure of the operator and the correct work procedure (Step S3). When having determined that the necessary work has been skipped (YES at Step S4), the display controller 102 returns to the process that includes the skipped work to cause the display 473 to redisplay the guidance video (Step S5). Then, a processing flow returns to Step S2, and the work identifying unit 103 continuously identifies the work performed by the operator based on the detection results of the sensors 91 to 93, and 691 to 693 (see FIG. 2).

At Step S5, when returning to the process that includes the skipped work to cause the display 473 to redisplay the guidance video, the display controller 102 (a) may cause the display 473 to redisplay by setting a display time of the guidance video that indicates the skipped work shorter than a default display time.

As another embodiment of Step S5, (b) the display controller 102 may cause the display 473 to redisplay from the guidance video that indicates the work of the previous work sequence by a predetermined work amount with respect to the skipped work, instead of the process indicated at Step S5. In this case, even when the work of the previous work sequence by the predetermined work amount is included in a further previous process by exceeding the process that includes the skipped work, the display controller 102 causes the display 473 to redisplay from the guidance video that indicates the work, which is included in the previous process, of the previous work sequence by the predetermined work amount.

Further, the display controller 102 may selectively perform any of the process (a) or (b) in accordance with contents of the instruction accepted by the operation unit 47.

Alternatively, when having determined that the work has not been skipped and has been performed in accordance with the procedure indicated by the process, and having determined that the work of the process later than the process corresponding to the guidance video being displayed on the display 473 is performed at this point (NO at Step S4 and YES at Step S6), the display controller 102 skips the guidance video of the intermediate processes of up to a present process the work of which the operator currently performs and causes the display 473 to display the guidance video of the present process (Step S7). Then, the processing flow returns to Step S2, and the work identifying unit 103 continuously identifies the work performed by the operator based on the detection results of the sensors 91 to 93, and 691 to 693 (see FIG. 2).

As another embodiment of Step S7, without skipping the guidance video of the intermediate processes of up to the present process the work of which the operator currently performs, the display controller 102 may cause the display 473 to display the guidance video of the present process after causing the display 473 to display the guidance video of the intermediate processes by setting the display time of the intermediate processes shorter than the default display time.

When the guidance video has not been displayed to the end (NO at Step S8), the processing flow returns to Step S2, and the display controller 102 continuously causes the display 473 to display the guidance video. The work identifying unit 103 continuously identifies the work performed by the operator based on the detection results of the sensors 91 to 93, and 691 to 693 (see FIG. 2).

On the other hand, when the guidance video has been displayed to the end (YES at Step S8), the display controller 102 determines whether the maintenance work by the operator has been completed or not based on the detection results of the sensors 91 to 93, and 691 to 693 (see FIG. 2), and returns to the process the work of which has not been completed yet by the operator to cause the display 473 to redisplay the guidance video (Step S10) when having determined that the maintenance work has not been completed (NO at Step S9). Then, the processing flow returns to Step S2, and the work identifying unit 103 continuously identifies the work performed by the operator based on the detection results of the sensors 91 to 93, and 691 to 693 (see FIG. 2). When having determined that the maintenance work has been completed by the operator (YES at Step S9), the display controller 102 terminates the displaying of the guidance video.

As described above, the embodiment detects the work procedure of an operation when the maintenance work of the image forming apparatus 1 is performed and ensures appropriate displaying of the guidance video in accordance with a progress status of the work by the operator.

The disclosure is not limited to the configuration of the above-described embodiment, and various modifications are possible. For example, while in the above-described embodiment the display 473 displays the guidance video, an external device such as a tablet terminal may be employed to display the guidance video. While the elimination work of the recording-sheet jam has been described as an example of the maintenance work, the maintenance work can include other works such as a replacement work of a toner bottle, a replenishment work of recording sheets, and an initial setup work of the image forming apparatus 1.

While the above-described embodiment has been described by using the image forming apparatus, as one example of the display apparatus according to the disclosure, this is merely one example, and the display apparatus according to the disclosure may be an apparatus such as a mobile device, medical equipment, and a ticket-vending machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A display apparatus including maintenance-related components operated for performing of maintenance on the display apparatus, the display apparatus comprising:
    sensors for detecting operational state of the maintenance-related components;
    a display;
    storage storing control programs, guidance videos showing correct maintenance-work process sequences for respective specified maintenance-work procedures performed on the display-apparatus, and data indicating correct maintenance-work process sequences for the respective specified maintenance-work procedures;
    control circuitry connected to the sensors and to the storage, the control circuitry operating according to the control programs stored in the storage and thereby functioning as
        a display controller for causing, when a given maintenance work procedure is performed on the display apparatus, the display to continuously display a guidance video showing a maintenance-work process sequence for the given maintenance work procedure; and
        a work identifying unit for identifying, based on detection results from the sensors, the given maintenance work procedure; wherein
    the display controller is further for time-series analyzing the maintenance-work process sequence of the given maintenance work procedure, as identified by the work identifying unit, being performed on the display apparatus, comparing the time-series analyzed work process sequence with the correct maintenance-work process sequence for the given maintenance work procedure, and for, if the comparison indicates that the maintenance-work process sequence of the given maintenance work procedure being performed on the display apparatus has any point not in accordance with the correct maintenance-work process sequence, causing the display to return its displaying of the guidance video to the point in the correct maintenance-work process sequence where the maintenance-work process sequence of the given maintenance work procedure is not in accordance with the correct maintenance-work process sequence.

2. The display apparatus according to claim 1, wherein if the comparison indicates that the maintenance-work process sequence of the given maintenance work procedure being performed on the display apparatus has any point not in accordance with the correct maintenance-work process sequence, the display controller:
    causes the display to return its displaying of the guidance video to the point not in accordance with the correct maintenance-work process sequence, and redisplay the guidance video by a predetermined amount corresponding to an unprocessed process in the correct maintenance-work process sequence.

3. The display apparatus according to claim 2, wherein the display controller causes the display to redisplay the guidance video by the predetermined amount by setting a guidance-video display time corresponding to the unprocessed process in the correct maintenance-work process sequence shorter than the display time during which the guidance video has been displayed prior to the unprocessed process.

4. The display apparatus according to claim 1, further comprising an operation unit that accepts an instruction from an operator, wherein if the comparison indicates that the maintenance-work process sequence of the given maintenance work procedure being performed on the display apparatus has any point not in accordance with the correct maintenance-work process sequence, the display controller, according to instruction accepted by the operation unit, either
    causes the display to return its displaying of the guidance video to the point not in accordance with the correct maintenance-work process sequence, and redisplay the guidance video by a predetermined amount corresponding to an unprocessed process in the correct maintenance-work process sequence, or
    causes the display to redisplay the guidance video by the predetermined amount by setting a guidance-video display time corresponding to the unprocessed process in the correct maintenance-work process sequence shorter than the display time during which the guidance video has been displayed prior to the unprocessed process.

5. The display apparatus according to claim 1, wherein if the comparison indicates that the maintenance-work process sequence of the given maintenance work procedure being performed on the display apparatus is in accordance with the correct maintenance-work process sequence, and the display controller's time-sequence analysis determines that a current process in the given maintenance work procedure being performed on the display apparatus is later than the process that corresponds to the guidance video being displayed at that point, the display controller causes the display to display the guidance video corresponding to the current process in the given maintenance work procedure being performed on the display apparatus, without causing the display to display the guidance video corresponding to intermediate processes up to the current process in the given maintenance work procedure.

6. The display apparatus according to claim 1, wherein if the comparison indicates that the maintenance-work process sequence of the given maintenance work procedure being performed on the display apparatus is in accordance with the correct maintenance-work process sequence, and the display controller's time-sequence analysis determines that a current process in the given maintenance work procedure being performed on the display apparatus is later than the process that corresponds to the guidance video being displayed at that point, the display controller causes the display to display the guidance video corresponding to the current process in the given maintenance work procedure being performed on the display apparatus, after causing the display to display the guidance video corresponding to intermediate processes up to the current process in the given maintenance work procedure by setting the guidance-video display time shorter than the display time during which the guidance video has been displayed prior to the current process.

7. The display apparatus according to claim 1, wherein the display controller causes the display to return its displaying of the guidance video to the point in the correct maintenance-work process sequence where the maintenance-work process sequence of the given maintenance work procedure is not in accordance with the correct maintenance-work process sequence, after the displaying of the guidance video for the final process in the correct maintenance-work process sequence is terminated.

8. A display method for a display apparatus including maintenance-related components operated for performing of maintenance on the display apparatus, sensors for detecting operational state of the maintenance-related components, and a display, the display method comprising:

causing, when a given maintenance work procedure is performed on the display apparatus, the display to continuously display a guidance video showing a maintenance-work process sequence for the given maintenance work procedure;

identifying, based on detection results from the sensors, the given maintenance work procedure; and time-series analyzing the maintenance-work process sequence of the given maintenance work procedure, as identified by the identifying, being performed on the display apparatus, comparing the time-series analyzed work process sequence with the correct maintenance-work process sequence for the given maintenance work procedure, and if the comparison indicates that the maintenance-work process sequence of the given maintenance work procedure being performed on the display apparatus has any point not in accordance with the correct maintenance-work process sequence, causing the display to return its displaying of the guidance video to the point in the correct maintenance-work process sequence where the maintenance-work process sequence of the given maintenance work procedure is not in accordance with the correct maintenance-work process sequence.

\* \* \* \* \*